United States Patent Office.

SAMUEL FIELDS, OF BRIDGEPORT, OHIO.

Letters Patent No. 71,597, dated December 3, 1867.

---

IMPROVED ROOFING-COMPOUND.

---

The Schedule referred to in these Letters Patent and making part of the same.

---

TO ALL WHOM IT MAY CONCERN:

Be it known that I, SAMUEL FIELDS, of Bridgeport, in the county of Belmont, and State of Ohio, have invented a new and useful Improvement in Roofing-Compounds; and I do hereby declare the following to be a full and exact description of the same, sufficient to enable others skilled in the art to which my invention appertains to understand and use the same.

I take cold coal-tar, and to a barrel of the same I add, first, ground fire-clay, then silicate of iron, and then silicate of magnesia, sufficient of each to give, when all are mixed, to the compound the necessary stiffness. I then add linseed or animal oil, in the proportion of about one gallon to a barrel of coal-tar, and finally mix with it litharge, in the proportion of about three pounds to the barrel of coal-tar.

I do not confine myself to the exact proportions of the ingredients, as I may make the compound thick, to spread it on felting or paper and cover it with sand, or I may may make it of the consistency of paint, and put it on to the roofs of steamboats and railroad-cars.

The ground fire-clay, silicate of iron, and silicate of magnesia render the roofing entirely fire-proof.

Having thus described my invention, what I claim as new, and desire to secure by Letters Patent, is:—

The roofing-compound, consisting of the above-named ingredients, substantially as described.

The above specification of my improved roofing-compound signed, this sixteenth day of May, 1867.

SAMUEL FIELDS.

Witnesses:
CHAS. D. DAVIS,
D. OURAND.